July 14, 1931. G. R. METCALF, JR., ET AL 1,814,481
CONDUIT FITTING
Filed Sept. 8, 1927

George R. Metcalf Jr
Frank J. Raybould
INVENTORS.

BY
ATTORNEYS.

Patented July 14, 1931

1,814,481

UNITED STATES PATENT OFFICE

GEORGE RALPH METCALF, JR., AND FRANK JAMES RAYBOULD, OF ERIE, PENNSYLVANIA, ASSIGNORS TO ERIE MALLEABLE IRON COMPANY, OF ERIE, PENNSYLVANIA, A CORPORATION OF PENNSYLVANIA

CONDUIT FITTING

Application filed September 8, 1927. Serial No. 218,327.

Conduit fittings have heretofore been formed with bodies having internal screw threads, and contractible sleeves screwed into the screw threads, the sleeves having wedging surfaces engaging the outer ends of the body. Efforts have been made to render such fittings water-tight but difficulty has been experienced in that the variations in conduit added to variations that may arise in the fittings themselves have made such a wide range in the axial movement of the sleeves as to render the ordinary packings inefficient. The present invention is designed to correct this difficulty. Features and details of the invention will appear from the specification and claims.

A preferred exemplification of the invention is illustrated in the accompanying drawings as follows:—

Figure 1:
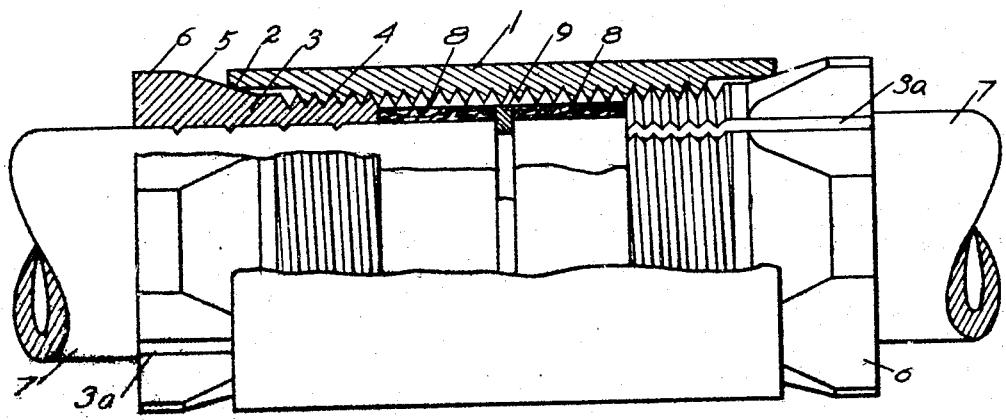

Fig. 1 shows a side elevation, partly in section.

Figure 2:
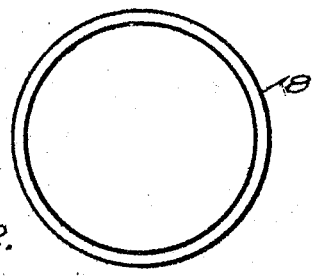

Fig. 2 an end view of the packing.

Figure 3:
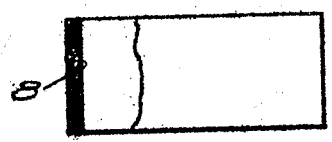

Fig. 3 a side elevation, partly in section, of the packing.

Figure 4:
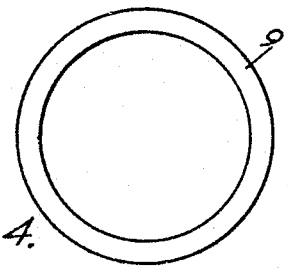

Fig. 4 an end view of a separating and locating ring for the packing.

Figure 5:
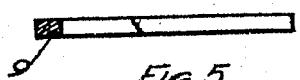

Fig. 5 a side elevation, partly in section, of the same ring.

1 marks the body of the fitting. As shown this is in the form of a conduit coupling. This body has a conduit-receiving opening with wedging surfaces 2 at the outer ends of the body.

A slotted contractible sleeve 3 is arranged in the opening, the sleeve having screw threads 4 at its inner end, the wedging surface 5 intermediate its ends, and a wrench-hold 6 at its outer end. The sleeve is rendered contractible by an axial slot 3a.

A conduit 7 is extended through the sleeve and is clamped by the sleeve as the sleeve is drawn into the body through the action of the screw and the wedging surfaces.

An elongated packing 8 is arranged between the inserted conduit and the sleeve. This is formed of readily compressible material so that with the wide range of inward movement of the sleeve incident to variations in conduit and the fitting the packing fills the gland, or opening formed within the fitting so as to make a complete closure. As shown sleeves are arranged at each end of the coupling and a packing provided for each sleeve. The packings are preferably separated by a ring 9 which is useful in locating the ends of the conduit and assuring a length of gasket intermediate the ends of the sleeve.

While we have illustrated our invention as particularly adapted for electric conduits we wish to be understood that the conduit is not limited to this particular application in its use.

What we claim as new is:—

1. In a conduit fitting, the combination of a body having a conduit-receiving opening therethrough, inner screw threads, and wedging surfaces at its outer ends; slotted contractible sleeves extending into each end of the opening, each sleeve having a screw-thread at its inner end and a wedging surface engaging a wedging surface of the body; and an elongated packing of material compressible with relation to its volume at the inner end of each sleeve between the body and adapted to surround an inserted conduit, said packing being compressed by the endwise movement of the sleeve, the length and compressibility of the packing forming a closure under variations of compression incident to variations of conduit and fitting.

2. In a conduit fitting, the combination of a body having a conduit-receiving opening therethrough, inner screw threads, and wedging surfaces at its outer ends; slotted contractible sleeves extending into each end of the opening, each sleeve having a screw-thread at its inner end and a wedging surface engaging a wedging surface of the body; an elongated packing of material compressible with relation to its volume at the inner end of each sleeve between the body and adapted to surround an inserted conduit, said packing being compressed by the endwise movement of the sleeve, the length and compressibility of the packing forming a closure under variations of compression incident to variations of conduit and fitting; and a wing arranged between the ends of inserted conduits and the packing.

In testimony whereof we have hereunto set our hands.

GEORGE RALPH METCALF, Jr.
FRANK JAMES RAYBOULD.